United States Patent
Donohoe

(10) Patent No.: US 10,339,325 B2
(45) Date of Patent: Jul. 2, 2019

(54) MULTI-LEVEL SECURITY MODEL FOR SECURING ACCESS TO ENCRYPTED PRIVATE DATA

(71) Applicant: JJD Software LLC, Saratoga Springs, NY (US)

(72) Inventor: Justin Donohoe, Saratoga Springs, NY (US)

(73) Assignee: JJD Software LLC, Saratoga Springs, NY (US)

(*) Notice: Subject to any disclaimer, the term of this patent is extended or adjusted under 35 U.S.C. 154(b) by 167 days.

(21) Appl. No.: 15/448,698

(22) Filed: Mar. 3, 2017

(65) Prior Publication Data
US 2017/0255784 A1 Sep. 7, 2017

Related U.S. Application Data

(60) Provisional application No. 62/302,864, filed on Mar. 3, 2016.

(51) Int. Cl.
| | |
|---|---|
| *G06F 21/60* | (2013.01) |
| *H04L 9/14* | (2006.01) |
| *H04L 9/06* | (2006.01) |
| *H04L 9/30* | (2006.01) |
| *H04L 29/06* | (2006.01) |
| *G09C 1/00* | (2006.01) |

(52) U.S. Cl.
CPC .......... *G06F 21/602* (2013.01); *G06F 21/604* (2013.01); *G09C 1/00* (2013.01); *H04L 9/14* (2013.01); *H04L 63/0272* (2013.01); *H04L 63/10* (2013.01); *H04L 9/30* (2013.01); *H04L 2209/76* (2013.01)

(58) Field of Classification Search
CPC ...... G06F 21/602; G06F 21/604; G06F 21/60; G09C 1/00; H04L 9/14; H04L 63/0272; H04L 63/10; H04L 2209/76; H04L 9/30; H04L 9/06; H04L 63/027
USPC ................. 713/153, 161, 166, 167; 726/2, 4
See application file for complete search history.

(56) References Cited

U.S. PATENT DOCUMENTS

| | | | |
|---|---|---|---|
| 2007/0297607 A1* | 12/2007 | Ogura | G06F 21/606 380/239 |
| 2015/0347772 A1* | 12/2015 | Nizami | G06F 21/604 707/783 |

(Continued)

FOREIGN PATENT DOCUMENTS

| | | | | |
|---|---|---|---|---|
| WO | WO-2015186820 A1 * | 12/2015 | ............. | G06F 12/00 |

*Primary Examiner* — Ashokkumar B Patel
*Assistant Examiner* — Quazi Farooqui
(74) *Attorney, Agent, or Firm* — Hoffman Warnick LLC

(57) ABSTRACT

A system, method and program product for implementing a database security model. A database security model is disclosed that includes: a system for maintaining private data in an encrypted storage area; an ENCR system for implementing a plurality of ENCR routines, wherein each of the ENCR routines is callable from a database application to access and process private data and wherein the ENCR system operates in a functional space separate from the database application; and a crypto system having a private key and decryption system, wherein the crypto system decrypts private data in response to receiving a decrypt request and public key from an ENCR routine, and wherein the crypto system operates in a functional space separate from the ENCR system.

20 Claims, 4 Drawing Sheets

(56) References Cited

U.S. PATENT DOCUMENTS

2016/0048690 A1\* 2/2016 Tanishima ................ H04L 9/00
  713/193
2018/0232266 A1\* 8/2018 Ikeda ...................... G06F 12/00

\* cited by examiner

MULTI-LEVEL SECURITY MODEL FOR SECURING ACCESS TO ENCRYPTED PRIVATE DATA

PRIORITY CLAIM

This application claims priority to provisional application, 62/302,864 filed on Mar. 3, 2016, the contents of which are hereby incorporated by reference.

TECHNICAL FIELD

The subject matter of this invention relates to data security, and more particularly to a model for securing data stored in an application database.

BACKGROUND

Data security continues to be significant challenge for information contained in application databases. Application databases utilize computer programs whose primary purpose is to enter and retrieve information, and are used in numerous fields, such as government, medical records, accounting, finance, science, web-based services, and so forth. One of the challenges with implementing application databases is the fact that the data often includes private or sensitive information, such as account information, social security numbers, medical records, etc., and such information is available to employees, developers, system administrators, etc. Accordingly, common strategies for handling private data include ensuring that access is password protected and data encryption.

Although it is relatively straightforward to provide password protection and encrypt data contained in such a database to protect user information, problems arise due to the fact that there are often numerous authorized users who have access to the decrypted data. Authorized users, whether acting intentionally or via comprised user credentials, create a significant risk of a data breach. In a typical environment, authorized users may include application users, developers, project managers, and system administrators. Any one of these actors could potentially misuse their credentials to compromise the data.

SUMMARY

Aspects of the disclosure provide a multi-level security model in which no single actor is capable of compromising data in an application database.

A first aspect discloses a database security model for securing data in an application database, comprising: a system for providing access to private data in an encrypted storage area; an ENCR system for implementing a plurality of ENCR routines, wherein each of the ENCR routines is callable from a database application to access and process private data and wherein the ENCR system operates in a functional space separate from the database application; and a crypto system having a private key and decryption system, wherein the crypto system decrypts private data in response to receiving a decrypt request and public key from an ENCR routine, and wherein the crypto system operates in a functional space separate from the ENCR system.

A second aspect discloses a computer program product stored on a computer readable storage medium, which when executed by a computing system, provides a database security model, the program product comprising: program code for providing access to private data in an encrypted storage area; first level program code for implementing a plurality of ENCR routines, wherein each of the ENCR routines is callable from a database application to access and process private data and wherein the first level program code operates in a functional space separate from the database application; and second level program code having a private key and a decryption routine, wherein the decryption routines decrypts private data in response to receiving a decrypt request and public key from the first level program code, and wherein second level program code operates in a functional space separate from the first level program code.

A third aspect discloses a computerized method for implementing a database security model, comprising: maintaining private data in an encrypted storage area; receiving a request at an application database that requires access to private data; passing an ENCR request to an ENCR routine that operates in a first level functional space separate from the database application; processing the ENCR request and submitting a decrypt request along with a public key to a crypto system that operates in a second level functional space separate from the ENCR routine; retrieving and decrypting private data within the crypto system using a stored private key and a submitted public key; passing decrypted private data to the ENCR routine; and returning an ENCR result to the database application.

BRIEF DESCRIPTION OF THE DRAWINGS

These and other features of this invention will be more readily understood from the following detailed description of the various aspects of the invention taken in conjunction with the accompanying drawings in which.

Figure 1:
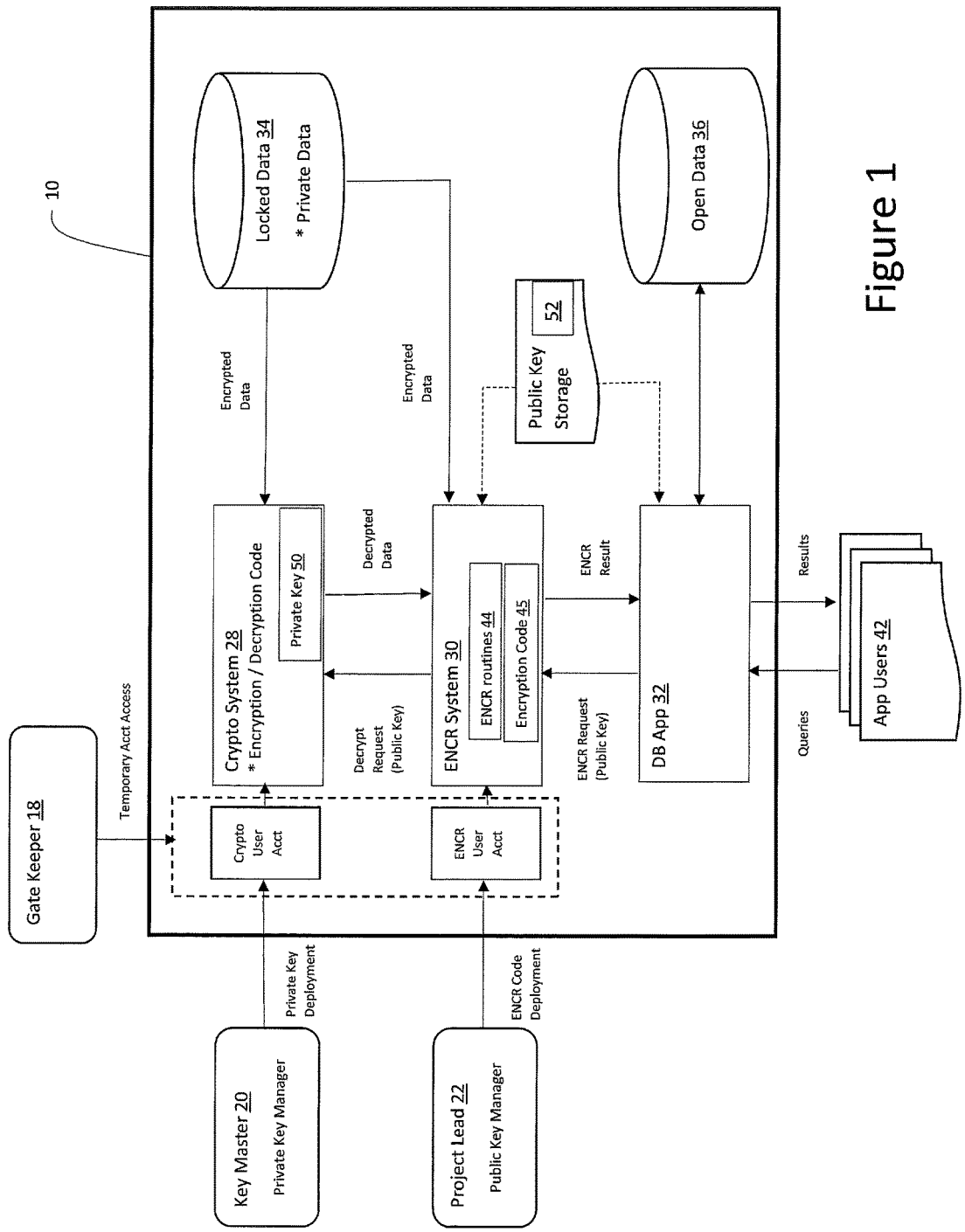
FIG. 1 shows a database security model according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a schematic overview of a database security model 10. In this illustrative embodiment, data is stored in two schemas, as "locked" data 34 that contain encrypted private data, e.g., Protected Personal Information (PPI), and as non-private application or "open" data 36 (collectively, the "database"). Locked data 34 include private data that remains encrypted and are not readily available as plain text while open data 36 include data that is readily available. For example, open data 36 may include the job title of a set of individuals, while the locked data 36 include social security numbers (SSNs), etc.

As detailed herein, locked data 34 can only be decrypted with a pair of keys, referred to herein as a private key 50 and a public key 52. The pair of keys 50, 52 are kept separate in order to ensure that no single person has access to both keys to access the locked data 34.

In general, application users 42 interface with a front-end database (DB) application 32, in which they submit queries and receive back results. For retrieving non-private information, the DB application 32 simply interfaces directly with tables in the open data 36 to obtain the necessary information. If it necessary to retrieve private data to execute an inputted query, the DB application 32 is not allowed to directly access the locked data 34. Instead, the DB application 32 must instead make a call to ENCR system 30, which includes one or more ENCR routines 44 (also referred to herein as ENCR_CODE) specifically implemented to handle the request. Thus, as described herein, although the DB application 32 cannot directly access and return private data from the locked data 34, the DB application 32 can provide functionality that allows an application user 42 to interface with private data in a limited fashion indirectly via an ENCR routine 44. For example, a user 42 may be able to enter an SSN to the DB application 32 to determine if there is a match in the locked data 34, which will in turn call an ENCR routine 44 and, e.g., return a yes or a no.

When private data is required to handle a query, the DB application 32 submits an ENCR request to ENCR system 30 which processes the request and returns an ENCR result. In some cases, the ENCR result may include a simple yes/no (e.g., a match exists) or may return actual decrypted private data (e.g., a date of birth). To handle ENCR requests, ENCR routines 44 can be implemented in two ways: (1) In a first approach, the ENCR routine 44 can use encryption code 45 along with a retrieved public key 52 to encrypt an inputted data record (e.g., an SSN). The encrypted data can then be, e.g., compared to an encrypted record or records in the locked data 34 to determine if a match exists. Using this approach, no data is ever decrypted—instead processing is done by comparing encrypted data records only. (2) In a second approach, the ENCR routine 44 can submit a decrypt request, along with the public key, to crypto system 28. Crypto system 28 includes decryption code and private key 50 that can be used (along with the inputted public key 52) to decrypt one or more locked data records. Once decrypted, the decrypted data is passed back to the ENCR system 30. Note that the public key 52 is not stored in the crypto system 28, but just temporarily used for the decryption request.

Note that the database application 32, ENCR system 30 and crypto system 28 are implemented in operationally distinct spaces or realms (i.e., first level and second level, respectively), such that access to files and processes in one space by a user does not allow for access to another. Each system 28, 30 may comprise its own physical or virtual server space.

Note also that the security model 10 may be implemented such that either or both the DB application 32 automatically retrieves the public key 52 from storage and passes it to ENCR system 30 and/or a qualified and authorized resource such as the project lead 22 manually retrieves the public key 52 from storage and passes it to the ENCR system 30 when access to private data is required from the DB application 32 or a qualified and authorized resource directly. Note that direct access with an account other than App Users 42 (such as the ENCR User Acct) requires activation of a user account by the gate keeper 18 and authorization from a qualified 3$^{rd}$ party such as the key master 20.

Thus, using this multi-level security approach, once an ENCR routine 44 is deployed to the ENCR system 30, developer resources can easily add functionality to the front-end DB application 32 to access private data without having decryption capabilities. Thus, neither the application user 42 nor internal developer resources can ever compromise the private data.

Equally important security issues also arise for higher level administrators who traditionally have system level access to all data. For example, it may be determined that the application users 42 require some additional limited private data access to perform their roles in an organization. In this case, a developer resource under the project lead 22 must write a new ENCR routine 44, which may require decryption access to the private data. As discussed in further detail herein, the present approach contemplates at least three different administrative roles, none of which are given unfettered access to the locked data 34. These roles include a gate keeper 18, a key master 20 and a project lead 22. Accordingly, rather than provide that developer resource with, e.g., a key, to allow for decryption, the illustrative security model 10 provides a platform to ensure that no single actor can access locked data 34.

The security model 10 operates with the following tenets:
(1) Bifurcated Key—The key used to encrypt or lock the data is comprised of at least two separate pieces (private key 50 and public key 52). Any actors who have access to part of the key must never be able to access all the other parts of the key to combine all of the pieces together and have the complete key. For example, if the gate keeper 18 and key master 20 have access to the private key 50 then the project lead 22 must not be allowed to access the private key. Further, in this example the gate keeper 18 and key master 20 must not be allowed to access or compromise the public key (2) Separation of Duties—Security duties are broken out into multiple roles creating a system of checks and balances. Each actor in the model has at least one other actor that can perform a check or block against that actor individually compromising protected resources. Also, an established process for requesting, authorizing, and completing system needs is utilized. For example, a database administrator cannot complete a request from a developer resource to have a secure account activated (or any request that was not approved by an established role within the organization). In order for any action to be taken, that action must be authorized by at least one and possibly two other qualified roles.

(3) Encryption—The sensitive data is encrypted using a robust algorithm so that the protected resources on their own cannot be read directly—a separate key is needed to unlock the data.

The primary accounts and associated roles are as follows:
(1) Gate Keeper 18, which is responsible for user access to the Crypto system 28 and ENCR system 30. The gate keeper 18 controls user creation, privileges, and access to objects contained therein. The gate keeper 18 may play a role in managing the private key, but does not have access to public key 52.

(2) Key Master 20, which is either fully or partially responsible for the private key 50, and storing the private key in the crypto system 28. The key master 20 also performs a very import audit function and can act as a qualified authorizer of requests whose approval is required for any action to proceed within the model. The key master 20 does not have access to the public key 52.

(3) Project Lead 22, which is responsible for the public key 52. The project lead 22 can request actions to be performed by the gate keeper 18 (e.g., allow access to the ENCR system 30) but these requests may require the authorization of at least one other qualified role such as the key master 20. The project lead 22 does not have access to the private key 50.

(4) Developer(s), which are responsible for application development and maintenance. The developer does not have access to either key, and cannot access live files or servers. Instead, the developer must provide updates and changes to the project lead 22. Note that this role is optional and these duties may be performed directly by the project lead 22. Note also that the developer role may include one or many resources of varying levels (e.g., Senior Developer, Technical Lead, etc.).

(5) Security Oversight, which is responsible for reviewing application code for back doors and other intentional breach attempts within the DB application 32. Note that this role is optional but recommended in cases where, e.g., sensitive data must be rendered in plain text in the DB application 32.

Accordingly, as shown in the illustrative embodiment of FIG. 1, the key master 20 is the only person authorized to temporarily access the crypto system 28 via a crypto user account when allowed by the gate keeper 18. Similarly, the project lead 22 is the only person authorized to temporarily access the ENCR system 30 via an ENCR user account when allowed by the gate keeper 18. As such, access to the crypto system 28 and ENCR system 30 is highly regulated, and requires at least two people aware of the access. This helps to ensure that no individual can for example install code on either system to capture the public or private key.

Figure 2:
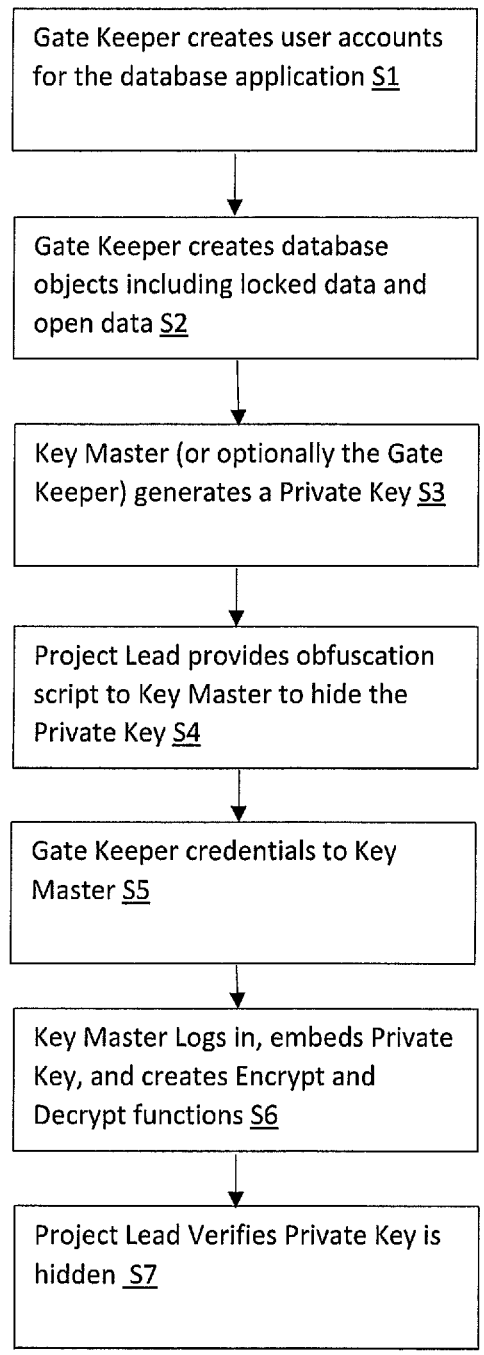
FIG. 2 shows a flow diagram of initializing a database with the security model according to embodiments.

FIG. 2 depicts a summary of the process of setting up the security model 10. Initially at S1, the gate keeper 18 creates user accounts, including crypto user account and ENCR user account. Additional accounts may include an application user account (e.g., APPUSER) and a locked table user account (e.g., LBX_USER). At S2, the gate keeper 18 creates database objects including the locked data 34 and open data 36 and at S3 the key master 20 (or optionally the gate keeper 18) generates a private key 50 and stores it in the crypto system 28. At S4, the project lead 22 provides an obfuscation script to the key master 20 to hide the private key 50 and at S5 the gate keeper 18 provides login information (e.g., CRYPTO_USER credentials) to the key master 20 and at S6, the key master logs in, embeds the private key 50 and creates encrypt and decrypt code functions. At S7, the project lead 22 verifies that the private key 50 is hidden. Note that the role of providing the script could be done by another entity, such as the gate keeper.

Figure 3:
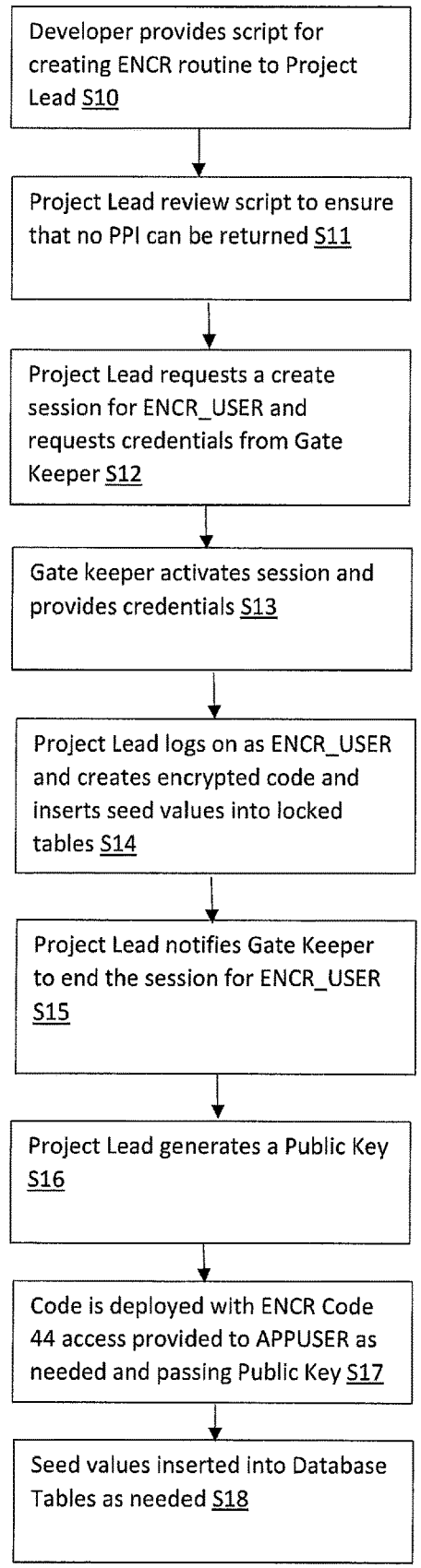
FIG. 3 shows a flow diagram for deploying encryption code functions according to embodiments.

FIG. 3 summarizes an illustrative process for deploying new ENCR routines (ENCR_CODE) 44. At S10, the developer resource provides a script for creating a new ENCR routine 44 to the project lead 22. The project lead 22 reviews the script to ensure that no (or only limited) private data can be returned at S11, and at S12 the project lead 22 requests a create session for an ENCR user account (ENCR_USER) and requests credentials from the gate keeper 18. At S13, the gate keeper 18 activates the session and provides the credentials and at S14 the project lead 22 logs on as ENCR_USER and creates the ENCR routine 44 and inserts seed values into the locked data 34 as needed. At S15, the project lead 22 notifies the gate keeper 18 to end the session for ENCR_USER and deploys the code. At S16, the project lead 22 generates a public key 52 in a secure storage region and at S17, requests access for APPUSER as needed. The public key 52 is passed as needed. Finally, at S18, seed values are inserted into the database as needed.

The project lead 22 instructs the Developer resources on the best use of plain text sensitive information in the application with a goal of minimizing or eliminating the retrieval of plain text sensitive data to the greatest extent possible:

a. Mask data unless it is absolutely necessary to display in plain text;

b. Bulk pulls of plain text sensitive data (reports) will run under special accounts that can be made active during specific time windows; and c. Token IDs are to be used instead if personal information based IDs.

Search algorithms may be written within the ENCR routine(s) 44 and return masked results and the Developer role has no access to the public key 52. Since the Developer provides code to the project lead 22 for deployment, the project lead 22 can review the code for attempts to compromise the public key 52. Also, the project lead 22 can utilize a separate repository that is not accessible by the developer to embed the public key 52 inside the application. Since the developer cannot access the ENCR system 30 where the public key 52 is deployed, it is difficult for the Developer to compromise the public key 52.

The use of a Cypher Key allows the public key 52 to be protected as well as the data. Note that this offers additional protection since the crypto system 28 code must now accommodate processing a protected public key 52, so the public key 52 does not necessarily need to be un-encrypted for it to be useful. The added benefit would be more related to cases where the data values were extracted from the database without the corresponding CRYPTO routines. In this scenario, someone with the two keys but not the CRYPTO routines would not be able to convert the data to plain text.

The Security Oversight role may be implemented, particularly when plain text data needs to be returned to the database application 32. Security Oversight must not be allowed access to accounts in the database that can access the private key 52.

Finally, in one illustrative embodiment, the Developer Role does not need to have access to the APPUSER database account.

The following checks and balances are provided by the security model 10.

(1) The key master 20 does not have access to the public key 52. Even with the public key 52, the key master 20 cannot make calls to decrypt the locked data 34 and cannot access the locked data 34. Best practice dictates, however, that care is taken to keep the public key 52 from the key master 20.

(2) The Developer does not have access to either of the keys and can only connect to the database with the APPUSER account in lower environments—not live or production environments. The Developer could theoretically include surreptitious code in the application intended to compromise the public key and/or unencrypted data returned from ENCR_CODE. The following checks serve to prevent these threats from becoming realized vulnerabilities:

a. The Developer cannot deploy code. The project lead manages deployments and can review the code for backdoors that may try to compromise data b. The Developer cannot access the public key. The project lead manages the public key and keeps it stored in a secure repository not accessible by Developers. The Project lead can look at every instance in the code where the public key is utilized and verify that it is not compromised.

c. A Security Oversight role can be incorporated to serve as a second set of eyes backing up the project lead checks d. The Developer cannot connect to the database using accounts that can call the CRYPTO routines. Since the gate keeper only processes requests initiated by the project lead, the Developer is blocked from requesting access to these accounts e. Note that compromised Developer credentials can serve as a very powerful attack tool to compromise secure data. Therefore, the Developer role may not be allowed to have accounts that can access production or live servers, file shares, databases, repositories, etc.:

i. A compromised Developer account could be susceptible to elevated privileges allowing a threat agent to install malicious code to intercept the public key or detect packets on the wire to gain access to plain text and route this information to an accessible location. To counter this, effective patching, firewall, and network monitoring strategies are recommended. Effective personnel management is also important to make sure old or unused user accounts to not remain active. Also, plain text sensitive data should only be passed when absolutely necessary. Time policies and limit filters are available in some database applications that allow accounts to access data only during certain time windows. Network monitors can be set to a higher level of vigilance during these windows.

ii. A compromised Developer account could be susceptible to elevated privileges allowing the theft of production application files (including operating system and database files) to an accessible location. To counter this, it is recommended that the public key be stored in a quality HSM appliance so that it is read and passed by the application at runtime. This way, the public key would not be included in the stolen information and the sensitive data could not be decrypted 3. Security Oversight has limited access in that it can only view application code. They may gain access to the public key if it is stored in the code, but because the role cannot access the database code; these users cannot access the private key. Also, because this role cannot connect to the database, they cannot attempt to utilize the public key to try and call ENCR_CODE that may return plain text sensitive data. Since they may be able to review configuration files that contain connection information, these strings would ideally be stored in an encrypted format to prevent unauthorized attempts to connect to the database.

4. Project Lead 22 is one of the most difficult roles to lock down because typically this is the role whose job most requires access to the information that needs to be secured. Moreover, this is the one role that can directly access the public key 52. All that would be needed to view encrypted data would be a connection to the database. In applications that do not return plain text data in the ENCR routines 44, the check against the project lead 22 is that a formal request must be entered and approved by a qualified $3^{rd}$ party such as the key master 20 in order for the SESSION privilege to be turned to ON for the ENCR_USER account, which can directly call the ENCR routines 44 (ENCR_CODE) and potentially, if enabled by the gate keeper with proper authorization, the LBX_USER account, which could directly call the Crypto System routines 28. When business needs dictate that plain text sensitive data needs to be returned from the ENCR_CODE, the project lead 22 could simply connect to the database using the APPUSER account and pass the public key 52 directly to return unencrypted data. Additionally, a malicious agent who compromised the project lead 22 credentials could do the same. Consequently, the following are recommended in cases where plain text sensitive data needs to be returned to the front-end application:

a. Take every step possible mask this data. For instance, searches can be coded into the ENCR_CODE in such a way as to mask potential matches but still allow the human to identify the correct match;

b. For reports and other functions that may require multiple records of plain text data, set up a separate account under which these functions run. Seek ways to limit and monitor the times when this account can actively connect to the data;

c. Employ a Security Oversight actor to monitor the application code for potential vulnerabilities;

d. Investigate network monitoring utilities that can monitor and report on specific types of network traffic and usage;

e. Investigate data store application policies limiting connectivity by IP address to prevent the project lead from making a direct connection with the APPUSER account.

5. The gate keeper can be the most difficult role to block from compromising the data. Since the main check against the gate keeper is that they do not possess the public key, preventing the gate keeper from obtaining the public key is crucial. Since the gate keeper 18 is typically a SYS level user in the database, there are inherently many means by which the gate keeper 18 can exploit the code to capture the public key 52. A database running on SiS processors in a secure framework will be very difficult for a malicious agent to leverage to compromise the public key 52 from the network or volatile memory. So the principle means of exploit for the gate keeper role is modifying the database code where the public key is passed as a parameter. It is very difficult to completely block the gate keeper role (and consequently a malicious actor who has compromised the gate keeper credentials) from modifying the object definitions that compromise the code. But it is possible to detect when this has occurred. For this reason, it is strongly recommended that the key master and project lead set up Crypto Sentry code checks on all database code where the public key is passed. Further, there needs to be an effective and timely response mechanism when these alterations are detected. Since the public key will only be passed to certain database routines, the Crypto Sentry can be focused on only these routines.

Additional features that can optionally be incorporated to enhance security include the following. Items passed in plain text on the wire are vulnerable to breach. Hardware and network protections can be used to mitigate this risk. For example, the unencrypted plain text values returned from a call to decrypt sensitive data for use in the front-end application are susceptible to being compromised by network sniffers. Securing the network can help mitigate these risks The process of encrypting and/or decrypting data occurs in the random or volatile memory within the data store application. While in-process, there is a potential vulnerability for a malicious agent to scrape the RAM in order to compromise the key. Utilizing data store applications that incorporate Software in Silicon (SiS) hardware that prevents external reads (scrapes) will mitigate this risk. Likewise, the operating systems that process the public key and pass the value to the data store application can employ the same protections.

Any time the public key is passed on the wire (network), the connection would ideally be encrypted (i.e. SSL or VPN). This will ensure the key is encrypted in transit and prevent breach via packet sniffing.

Keys (Public and Private) will ideally be stored outside of the application. Care will need to be taken that these keys are not stored in such a way that it would be easy for a malicious actor to compromise the backup where the keys are stored. Strong Encryption tools such as Advanced Encryption Standard with a 256 bit key (AES256) are recommended. A strong source code repository is recommended for storing the code that will house the public key.

Most data store applications possess filter policy roles that only allow connectivity from specific IP addresses. This functionality can be utilized to prevent compromised credentials from being used to connect to the database from unauthorized entry points. The application connection information will ideally be stored in a secured manner such as encrypting the connection string if stored in a configuration file.

Vulnerabilities may lie within the integrity of the overall architecture (outside the security model 10). For example, unhandled exceptions within an application can be sources of vulnerability. These can be mitigated by Runtime Application Self Protection (RASP) components, strong Firewalls, good software patching practices, network monitoring, etc.

Since most data store applications provide a mechanism to detect the user id, IP address, server name, etc., from the calling entity, additional security can be achieved by adding platform specific code to the ENCR and CRYPT routines that check for these properties and raise an exception if the server Meta Data is incorrect.

Some data store applications provide utilities for separating the duties of accounts within the data store. These utilities can help make it more difficult for the gate keeper and other SYS level users in the data store to compromise the data and/or the keys.

The keys would ideally be changed every 12 months or less. One means to accomplish this is to write a code routine in the ENCR_CODE that takes both the new and the prior public key and makes a call to the CRYPTO_CODE routine to decrypt using prior key passing the prior public key and then taking the result and calling the CRYPTO_CODE routine to encrypt the data passing the new public key. The newly encrypted values would overwrite the pre-existing values.

For applications that need to display plain text sensitive information from the database, system level application user accounts would be able to log in to the application and view data. Consequently, it is most secure if these accounts are disabled and can only be enabled by a project lead request approved by an authorized $3^{rd}$ party such as the key master.

Sensitive data can be tokenized to add an additional layer of anonymity. For example, random IDs can be created for each client record, and the random id can then be utilized by the application to represent an applicant, using that ID to process sensitive data only when needed. Since the ID on its own could not be used to identify a given person, it is much safer than using personal information as the record identifier.

An alternative approach may be implemented as follows, again with reference to FIG. 1.

The gate keeper 18 creates the CRYPTO_USER, ENCR_USER, APPUSER and LBX_USER accounts. Note that it is recommended that accounts be created under the 'Least Privilege' doctrine. In other words, the accounts will be given the least amount of privilege necessary to perform the needs of the account. Additional privileges can be added later if needed if authorized, but it is better to have the account ask for additional privileges rather than automatically have them.

1) The gate keeper 18 creates the CRYPTO_READ_USER account and GRANTS SELECT privileges on the core table that lists objects within the database (i.e. OBJ$)
2) The gate keeper 18 grants the CRYPTO_USER account privileges to connect to the database and to create packages/procedures/functions
3) The key master 20 then provides the gate keeper 18 with the private key.
4) The gate keeper 20 logs in with the CRYPTO_USER account and creates the CRYPTO_CODE in the Crypto System 28 embedding the private key 50. Here is sample code for CRYPTO_CODE:

```
CREATE OR REPLACE PACKAGE CRYPTO_CODE
AS
    PRIVATE_KEY_STRING    VARCHAR2(16) DEFAULT 'EncrpKeyGoesHere';
    FUNCTION DECRYPT_RAW_TO_TEXT (P_PUBLIC_KEY VARCHAR2,
P_ENCRYPTED RAW) RETURN VARCHAR2 DETERMINISTIC;
    FUNCTION ENCRYPT_TEXT_TO_RAW (P_PUBLIC_KEY VARCHAR2,
P_PLAINTEXT VARCHAR2) RETURN RAW DETERMINISTIC;
END CRYPTO_CODE;
/
CREATE OR REPLACE PACKAGE BODY CRYPTO_CODE
AS
    FUNCTION DECRYPT_RAW_TO_TEXT (P_PUBLIC_KEY VARCHAR2,
P_ENCRYPTED RAW) RETURN VARCHAR2 DETERMINISTIC
    IS
        DECRYPT_RAW      RAW (2048);
        ENCRYPTION_KEY   RAW (32);
        ENCRYPTION_TYPE  PLS_INTEGER := DBMS_CRYPTO.ENCRYPT_AES256
                         + DBMS_CRYPTO.CHAIN_CBC
                         + DBMS_CRYPTO.PAD_PKCS5;
        KEY_STRING VARCHAR2(255);
    BEGIN
        KEY_STRING := PRIVATE_KEY_STRING || P_PUBLIC_KEY;
        ENCRYPTION_KEY := UTL_RAW.CAST_TO_RAW(KEY_STRING);
        DECRYPT_RAW := DBMS_CRYPTO.DECRYPT
        ( SRC => P_ENCRYPTED,
          TYP => ENCRYPTION_TYPE,
          KEY => ENCRYPTION_KEY
        );
        RETURN (UTL_RAW.CAST_TO_VARCHAR2 (DECRYPT_RAW));
    END DECRYPT_RAW_TO_TEXT;
```

-continued

```
FUNCTION ENCRYPT_TEXT_TO_RAW (P_PUBLIC_KEY VARCHAR2,
P_PLAINTEXT VARCHAR2) RETURN RAW DETERMINISTIC
  IS
    ENCRYPTED_RAW    RAW (2048);
    ENCRYPTION_KEY   RAW (32);
    ENCRYPTION_TYPE  PLS_INTEGER := DBMS_CRYPTO.ENCRYPT_AES256
                  + DBMS_CRYPTO.CHAIN_CBC
                  + DBMS_CRYPTO.PAD_PKCS5;
    KEY_STRING VARCHAR2(255);
  BEGIN
    KEY_STRING := PRIVATE_KEY_STRING || P_PUBLIC_KEY;
    ENCRYPTION_KEY := UTL_RAW.CAST_TO_RAW(KEY_STRING);
    ENCRYPTED_RAW := DBMS_CRYPTO.ENCRYPT
      ( SRC => UTL_RAW.CAST_TO_RAW (P_PLAINTEXT),
        TYP => ENCRYPTION_TYPE,
        KEY => ENCRYPTION_KEY
      );
    RETURN ENCRYPTED_RAW;
  END ENCRYPT_TEXT_TO_RAW;
END CRYPTO_CODE;
/
```

6) The gate keeper 18 then removes the SESSION privilege from CRYPTO_USER so that it cannot connect to the DB 7) The key master 20 uses the CRYPTO_READ_USER account to ensure that only one object exists for the CRYPTO_USER account in the Crypto System 28. For example:
   a. select * from ALL_SOURCE where OWNER='CRYPTO_USER'

8) The key master uses the CRYPTO_READ_USER account to verify the contents of the CRYPTO_CODE function in the Crypto System 28 to ensure that code and private key 50 and public key 52 that will passed in from the ENCR System 30 are not compromised. For example:

```
a.  declare
b.    StrLine VARCHAR2(4000);
c.    rec_cursor SYS_REFCURSOR;
d.  begin
e.    --Pull all lines from routine
f.    OPEN rec_cursor FOR 'select TEXT from ALL_SOURCE where
      OWNER = "CRYPTO_USER" and NAME = "CRYPTO_CODE"
      and TYPE = "PACKAGE BODY"';
g.    LOOP
h.      FETCH rec_cursor INTO StrLine;
i.      IF rec_cursor%NOTFOUND THEN
j.        EXIT;
k.      END IF;
l.      dbms_output.put(StrLine);
m.    END LOOP;
n.    CLOSE rec_cursor;
o.    dbms_output.put_line('');
p.  end;
```

9) The key master uses the CRYPTO_READ_USER account to log a hash value for the CRYPTO_CODE routine in the Crypto System 28. For example:

```
a.  declare
b.    StrVal CLOB;
c.    StrLine VARCHAR2(4000);
d.    HashKey NUMBER;
e.    rec_cursor SYS_REFCURSOR;
f.    TYPE HashTable IS TABLE OF NUMBER INDEX BY
      binary_integer;
g.    HashArray HashTable;
h.    HashClobKey VARCHAR(4000);
i.  begin
j.    --Pull all lines from routine into single CLOB variable
k.    OPEN rec_cursor FOR 'select TEXT from ALL_SOURCE where
      OWNER = "CRYPTO_USER" and NAME = "CRYPTO_CODE"
      and TYPE = "PACKAGE BODY"';
l.    LOOP
m.      FETCH rec_cursor INTO StrLine;
n.      IF rec_cursor%NOTFOUND THEN
o.        EXIT;
p.      END IF;
q.      IF StrVal IS NULL THEN
r.        StrVal := StrLine;
s.      ELSE
t.        StrVal := CONCAT(StrVal, StrLine);
u.      END IF;
v.    END LOOP;
w.    CLOSE rec_cursor;
x.    --Chunk CLOB inot string blocks of 4000 to ensure consistent hash
      value
y.    FOR i in 1 .. ceil(length(StrVal)/4000)
z.    LOOP
aa.     StrLine := to_char(substr(StrVal, (i-1)*4000+1,4000));
bb.     SELECT db_hash(StrLine, length(StrLine), length(StrLine)) into
        HashKey from DUAL;
cc.     HashArray(i) := HashKey;
dd.   END LOOP;
ee.   FOR i IN 1..HashArray.count
ff.   LOOP
gg.     HashClobKey := CONCAT(HashClobKey,
        to_char(HashArray(i)));
hh.   END LOOP;
ii.   dbms_output.put_line(HashClobKey);
jj. end;
```

10) The key master then creates the anomaly detection routine using the hash value returned from above. For example:

```
a.  declare
b.    StrVal CLOB;
c.    StrLine VARCHAR2(4000);
d.    HashKey NUMBER;
e.    rec_cursor SYS_REFCURSOR;
f.    TYPE HashTable IS TABLE OF NUMBER INDEX BY
      binary_integer;
g.    HashArray HashTable;
h.    HashClobKey VARCHAR(4000);
i.  begin
j.    --Pull all lines from routine into single CLOB variable
```

-continued

```
k.   OPEN rec_cursor FOR 'select TEXT from ALL_SOURCE where
     OWNER = "CRYPTO_USER" and NAME = "CRYPTO_CODE"
     and TYPE = "PACKAGE BODY"';
l.   LOOP
m.   FETCH rec_cursor INTO StrLine;
n.   IF rec_cursor%NOTFOUND THEN
o.     EXIT;
p.   END IF;
q.   IF StrVal IS NULL THEN
r.     StrVal := StrLine;
s.   ELSE
t.     StrVal := CONCAT(StrVal, StrLine);
u.   END IF;
v.   END LOOP;
w.   CLOSE rec_cursor;
x.   --Chunk CLOB inot string blocks of 4000 to ensure consistent hash
     value
y.   FOR i in 1 .. ceil(length(StrVal)/4000)
z.   LOOP
aa.    StrLine := to_char(substr(StrVal, (i-1)*4000+1,4000));
bb.    SELECT db_hash(StrLine, length(StrLine), length(StrLine)) into
       HashKey from DUAL;
cc.    HashArray(i) := HashKey;
dd.  END LOOP;
ee.  FOR i IN 1..HashArray.count
ff.  LOOP
gg.    HashClobKey := CONCAT(HashClobKey,
       to_char(HashArray(i)));
hh.  END LOOP;
ii.  if HashClobKey != 346 then
jj.    --Take anomaly detection action;
kk.  end if;
ll.  end;
```

11) The gate keeper 18 then grants EXECUTE privileges on CRYPTO_CODE in the Crypto System 28 to the ENCR_USER account 12) The gate keeper 18 then grants the SESSION privilege to ENCR_USER so that it can connect to the DB 13) The gate keeper 18 grants the ENCR_USER account with privileges to create packages/procedures/functions in the ENCR System 30 and provides credentials to project lead 22

14) The project lead 22 then leads the creation of the ENCR_CODE functions in the ENCR System 30. In this example, the decrypt routines are not publicly accessible by calls to ENCR_CODE routines in the ENCR System 30. This ensures that the code cannot be used to compromise the sensitive data. Note that decrypt routines are included as calls nested within the public routines, but so long as these nested decryption values are not returned directly (only TRUE/FALSE is returned) they do not pose a security threat. Note that the script in this example that creates the ENCR_CODE routines in the ENCR System 30 returns an immediate Hash value that can be provided to the key master 20 to ensure no tampering occurred by the gate keeper 18 (or some other malicious actor) while the ENCR_USER account is active. Here is example code:

```
CREATE OR REPLACE PACKAGE ENCR_CODE
AS
  FUNCTION Encrypt_Text_To_Raw (p_Public_Key VARCHAR2, p_PlainText
VARCHAR2) RETURN RAW DETERMINISTIC;
  FUNCTION MatchDatePart (p_Public_Key VARCHAR2, p_First_Date RAW,
p_Second_Date RAW, p_Date_Part VARCHAR2, p_Format VARCHAR2) RETURN
BOOLEAN;
END;
/
CREATE OR REPLACE PACKAGE BODY ENCR_CODE
AS
  FUNCTION Encrypt_Text_To_Raw (p_Public_Key VARCHAR2, p_PlainText
VARCHAR2) RETURN RAW DETERMINISTIC
    IS
    BEGIN
      RETURN CRYPTO_CODE.Encrypt_Text_To_Raw(p_Public_Key, p_PlainText);
    END Encrypt_Text_To_Raw;
  FUNCTION MatchDatePart (p_Public_Key VARCHAR2, p_First_Date RAW,
p_Second_Date RAW, p_Date_Part VARCHAR2, p_Format VARCHAR2) RETURN
BOOLEAN
    IS
      retVal BOOLEAN DEFAULT FALSE;
      Encrypted_Val RAW (2048);
      textVal VARCHAR2(255);
      dateValOne DATE;
      dateValTwo DATE;
      DateString VARCHAR2(255);
      val_exists NUMBER;
    BEGIN
    IF p_Public_Key IS NOT NULL AND p_First_Date IS NOT NULL AND
p_Second_Date IS NOT NULL AND p_Date_Part IS NOT NULL AND p_Format IS
NOT NULL THEN
      textVal := CRYPTO_CODE.Decrypt_Raw_To_Text(p_Public_Key, p_First_Date);
      IF textVal IS NOT NULL THEN
        dateValOne := TO_DATE(textVal, p_Format);
      END IF;
      textVal := CRYPTO_CODE.Decrypt_Raw_To_Text(p_Public_Key,
p_Second_Date);
      IF textVal IS NOT NULL THEN
        dateValTwo := TO_DATE(textVal, p_Format);
      END IF;
      IF dateValOne IS NOT NULL AND dateValTwo IS NOT NULL THEN
        IF UPPER(p_Date_Part) = UPPER('DAY') THEN
```

```
       IF TO_CHAR(dateValOne, 'DD') = TO_CHAR(dateValTwo, 'DD') THEN
         retVal := TRUE;
       END IF;
     ELSIF UPPER(p_Date_Part) = UPPER('MONTH') THEN
       IF TO_CHAR(dateValOne, 'MM') = TO_CHAR(dateValTwo, 'MM') THEN
         retVal := TRUE;
       END IF;
     ELSIF UPPER(p_Date_Part) = UPPER('YEAR') THEN
       IF TO_CHAR(dateValOne, 'YYYY') = TO_CHAR(dateValTwo, 'YYYY') THEN
         retVal := TRUE;
       END IF;
     END IF;
   END IF;
 END IF;
 RETURN retVal;
 EXCEPTION
   WHEN OTHERS THEN
     RETURN retVal;
 END MatchDatePart;
END;
/
--Immediately capture HASH value
declare
 StrVal CLOB;
 StrLine VARCHAR2(4000);
 HashKey NUMBER;
 rec_cursor SYS_REFCURSOR;
 TYPE HashTable IS TABLE OF NUMBER INDEX BY binary_integer;
 HashArray HashTable;
 HashClobKey VARCHAR(4000);
begin
  --Pull all lines from routine into single CLOB variable
  OPEN rec_cursor FOR 'select TEXT from ALL_SOURCE where OWNER =
"ENCR_USER" and NAME = "ENCR_CODE" and TYPE = "PACKAGE BODY"';
  LOOP
    FETCH rec_cursor INTO StrLine;
    IF rec_cursor%NOTFOUND THEN
      EXIT;
    END IF;
    IF StrVal IS NULL THEN
      StrVal := StrLine;
    ELSE
      StrVal := CONCAT(StrVal, StrLine);
    END IF;
  END LOOP;
  CLOSE rec_cursor;
  --Chunk CLOB into string blocks of 4000 to ensure consistent hash value
  FOR i in 1 .. ceil(length(StrVal)/4000)
  LOOP
    StrLine := to_char(substr(StrVal, (i-1)*4000+1,4000));
    SELECT db_hash(StrLine, length(StrLine), length(StrLine)) into HashKey from
DUAL;
    HashArray(i) := HashKey;
  END LOOP;
  FOR i IN 1..HashArray.count
  LOOP
    HashClobKey := CONCAT(HashClobKey, to_char(HashArray(i)));
  END LOOP;
  dbms_output.put_line(HashClobKey);
 end;
 /
```

15) The project lead 22 provides the Hash value to the key master 20
16) The gate keeper 18 then removes the SESSION privilege from ENCR_USER so that it cannot connect to the DB
17) The gate keeper 18 then grants EXECUTE privileges on ENCR_CODE in the ENCR System 30 to any application accounts that will need to utilize the CRYTPO functionality such as an APPUSER account
18) The key master 20 uses the CRYPTO_READ_USER account to ensure that only the appropriate number of objects exists for the ENCR_USER account in the ENCR System 30. For example:

a.  select * from ALL_SOURCE where OWNER='ENCR_USER'

19) The key master uses the CRYPTO_READ_USER account to verify the contents of the ENCR_CODE function to ensure that no back doors or other breaches have been coded into the routine in the ENCR System 30. For example:

a.  declare
b.  StrLine VARCHAR2(4000);
c.  rec_cursor_SYS_REFCURSOR;
d.  begin
e.  --Pull all lines from routine

```
f.   OPEN rec_cursor FOR 'select TEXT from ALL_SOURCE where
     OWNER = "ENCR_USER" and NAME = "ENCR_CODE" and
     TYPE = "PACKAGE BODY"';
g.   LOOP
h.     FETCH rec_cursor INTO StrLine;
i.     IF rec_cursor%NOTFOUND THEN
j.       EXIT;
k.     END IF;
l.     dbms_output.put(StrLine);
m.   END LOOP;
n.   CLOSE rec_cursor;
o.   dbms_output.put_line('');
p.  end;
```

20) The key master uses the CRYPTO_READ_USER account to log a hash value for the ENCR_CODE routine in the ENCR System 30. For example:

```
a.  declare
b.    StrVal CLOB;
c.    StrLine VARCHAR2(4000);
d.    HashKey NUMBER;
e.    rec_cursor SYS_REFCURSOR;
f.    TYPE HashTable IS TABLE OF NUMBER INDEX BY
      binary_integer;
g.    HashArray HashTable;
h.    HashClobKey VARCHAR(4000);
i.  begin
j.    --Pull all lines from routine into single CLOB variable
k.    OPEN rec_cursor FOR 'select TEXT from ALL_SOURCE where
      OWNER = "ENCR_USER" and NAME = "ENCR_CODE" and
      TYPE = "PACKAGE BODY"';
l.    LOOP
m.      FETCH rec_cursor INTO StrLine;
n.      IF rec_cursor%NOTFOUND THEN
o.        EXIT;
p.      END IF;
q.      IF StrVal IS NULL THEN
r.        StrVal := StrLine;
s.      ELSE
t.        StrVal := CONCAT(StrVal, StrLine);
u.      END IF;
v.    END LOOP;
w.    CLOSE rec_cursor;
x.    --Chunk CLOB inot string blocks of 4000 to ensure consistent hash
      value
y.    FOR i in 1 .. ceil(length(StrVal)/4000)
z.    LOOP
aa.     StrLine := to_char(substr(StrVal, (i−1)*4000+1,4000));
bb.     SELECT db_hash(StrLine, length(StrLine), length(StrLine)) into
        HashKey from DUAL;
cc.     HashArray(i) := HashKey;
dd.   END LOOP;
ee.   FOR i IN 1..HashArray.count
ff.   LOOP
gg.     HashClobKey := CONCAT(HashClobKey,
        to_char(HashArray(i)));
hh.   END LOOP;
ii.   dbms_output.put_line(HashClobKey);
jj.  end;
```

21) If the Hash value returned from above does not match the Hash value provided by the project lead 22, then the deployment is halted as tampering may have occurred and will need to be investigated 22) The key master 20 then creates the anomaly detection routine using the hash value returned from above. For example:

```
a.  declare
b.    StrVal CLOB;
c.    StrLine VARCHAR2(4000);
d.    HashKey NUMBER;
e.    rec_cursor SYS_REFCURSOR;
f.    TYPE HashTable IS TABLE OF NUMBER INDEX BY
      binary_integer;
g.    HashArray HashTable;
h.    HashClobKey VARCHAR(4000);
i.  begin
j.    --Pull all lines from routine into single CLOB variable
k.    OPEN rec_cursor FOR 'select TEXT from ALL_SOURCE where
      OWNER = "ENCR_USER" and NAME = "ENCR_CODE" and
      TYPE = "PACKAGE BODY"';
l.    LOOP
m.      FETCH rec_cursor INTO StrLine;
n.      IF rec_cursor%NOTFOUND THEN
o.        EXIT;
p.      END IF;
q.      IF StrVal IS NULL THEN
r.        StrVal := StrLine;
s.      ELSE
t.        StrVal := CONCAT(StrVal, StrLine);
u.      END IF;
v.    END LOOP;
w.    CLOSE rec_cursor;
x.    --Chunk CLOB inot string blocks of 4000 to ensure consistent hash
      value
y.    FOR i in 1 .. ceil(length(StrVal)/4000)
z.    LOOP
aa.     StrLine := to_char(substr(StrVal, (i−1)*4000+1,4000));
bb.     SELECT db_hash(StrLine, length(StrLine), length(StrLine)) into
        HashKey from DUAL;
cc.     HashArray(i) := HashKey;
dd.   END LOOP;
ee.   FOR i IN 1..HashArray.count
ff.   LOOP
gg.     HashClobKey := CONCAT(HashClobKey,
        to_char(HashArray(i)));
hh.   END LOOP;
ii.   if OutVal != 581 then
jj.     --Take anomaly detection action;
kk.   end if;
ll.  end;
```

23) Note that typically, the gate keeper 18 can activate either of the CODE user accounts at any time and modify the CRYPTO and ENCR code in the Crypto System 28 and/or the ENCR System 30. By modifying the code, the gate keeper 18 could subvert decrypted data and/or compromise the public key 52 as it is passed in and then be in possession of both keys. In most cases, these code changes would not be detected by either the project lead 22 or the key master 20. In the TSM™, the measure that prevents this action from becoming a threat event is the comparison of the CODE signatures in the anomaly detection routines. If the gate keeper 18 role were to attempt this type of breach, the signature of the modified CODE would be different than that logged by the key master 20. Consequently, the key master 20 has the ability to serve as a CRYPTO SENTRY to detect and prevent this type of breach. The frequency of the CRYPTO SENTRY checks will determine the size of the window available for a gate keeper 18 role to compromise the code. For instance, if the anomaly check routine is performed on every call to an ENCR System 30 or Crypto System 28 routine, then the breach window would be zero. If the call is performed intermittently, then the time window between checks becomes the maximum breach window. Regardless of the frequency, the CRYPTO SENTRY routines become an important check against the gate keeper 18 acting unilaterally to compromised locked data. The anomaly detection routines in the CRYPTO SENTRY it will need to run in such a manner that the gate keeper 18 cannot deactivate, override or modify. For example, the Crypto Sentry can be setup to run as an application outside the domain of the gate keeper (as well as the project lead). This would be represented in FIG. 1 as a separate realm or space accessible only by the key master 20, which would have read access to the Crypto System 28 and ENCR System 30.

24) The project lead 22 then creates a public key 52. Note that the ideal place to store the public key 52 is in a Hardware Security Management (HSM) appliance with the code that passes the public key 52 to the ENCR System 30 routines in the database pulling the public key 52 at runtime from the HSM.

25) The project lead 22 embeds a routine to manage and pass the public key 52 into the DB App 32. Note, that upon successfully authorized request the gate keeper 18 could potentially enable session on a specified account such as LBX_USER to call either the Crypto System 28 or ENCR System 30 directly by manually pulling the public key 52 and passing it as a parameter 26) Note that it is good practice for the project lead 22 to test ENCR System 30 routines to make sure encryption works properly—particularly if the public key 52 is cypher protected. Before testing, however, it is best to ensure that the public key 52 will not be compromised when it is passed in to the Crypto System 28 and/or ENCR System 30 routines.

In a further embodiment, the private key 50 is stored both in the Crypto System 28 and in a Hardware Security Module (HSM). Note that if the public key 52 is stored in an HSM it would need to be kept separate from the private key 50. In this scenario, no decrypted data is returned from ENCR System 30. Instead, encrypted values are returned and then passed into the HSM along with the public key 52 to decrypt at the point of display.

In still a further embodiment, gate keeper 18 manages private key 50 separately from key master 20. In this scenario the key master 20 becomes a sentry only role (and potentially the additional authorizer besides the project lead 22).

In still a further embodiment, the key master 20 role is eliminated. In this scenario, the gate keeper 18 manages the private key 50 and creates Crypto System 28. Without the key master 20 to serve as CRYPTO SENTRY, the gate keeper 18 will need be perform anomaly detection on the ENCR System 30 and the project lead 22 will need do the same on both the Crypto System 28 and ENCR System 30. Since the project lead will now be able to view the Crypto System 28, the private key 50 will need to be extracted and stored under an account separate (but accessible) by Crypto System 28 user account. For example, the gate keeper 18 could create a CRYPTO_KEY_USER that creates an object or CRYTPO KEY CODE routine (preferably obfuscated to prevent over-the-shoulder breaches) that simply returns the private key 50, and then grant EXECUTE privileges to CRYPTO_USER on this new routine. This routine call could be placed in the Crypto System 28, but since the project lead 22 can only view the code (not execute) they will not be able to see the private key 50 even as they are checking the Crypto System 28 CODE for anomalies. Note that without the key master 18 it will be much more difficult to monitor cases where the project lead 22 is requesting the ability to call the Crypto System 28 directly or put public decrypt routines in the ENCR System 30. For example, a malicious actor spoofing the project lead 22 role and having the public key 52 could directly request access the Crypto System 28 routines from the gate keeper 18. If granted, this malicious actor would have all the resources needed to compromise locked data. In this scenario, additional 3$^{rd}$ party oversight and/or approval is recommended.

In still a further embodiment, salting can be incorporated into some or all of the locked data 34 values for added security In still a further embodiment, the public key 52 can be cypher protected using the Crypto System 28 routines so that it is not stored or passed as plain text. This would involve the gate keeper 18 allowing session connect on the CRYPTO_USER account so the project lead 22 could pass the public key 52 to the Crypto System 28 cypher routine to get back an encrypted value for the public key 52. Calls in the ENCR System 30 routines would need to account for the encrypted public key 52 and utilize routines in the Crypto System 28 routines that decrypt the public key before combining with the private key 50. Since the cypher value of the public key 52 can still be used to call the Crypto System 28 routines to unlock locked data 34, this only adds protection for cases where the locked data has been exfiltrated along with the private key 50 but without the Crypto System 28. In this scenario, the cyphered public key 52 could not be combined manually with the private key 50 to decrypt the locked data 34.

In still a further embodiment, private key 50 embedded outside of Crypto System 28. The key master 20 executes a script under a separate account (i.e. CRYPTO_KEY_USER) to store the private key 50 in a separate object or routine (preferably obfuscated to prevent over-the-shoulder breaches) that returns the private key 50. Once this script is executed, the separate account is deactivated. The key master 20 then provides the script to create the Crypto System 28 routines to the gate keeper 18. This Crypto System 28 script will contain a call to retrieve the private key 50 from the new object or routine created by the key master 20. The CRYPTO_USER would be granted EXECUTE or SELECT privileges on the private key 50 store, but would not be able to view it. In this scenario, the project lead 22 could perform the CRYPTO SENTRY duties because the project lead 22 can only view the code (not execute or select from an object)—they will not be able to see the private key 50 even as they are checking the Crypto System 28 for anomalies.

In still a further embodiment, the Crypto System 28 can be written to store Previous private keys and have routines to utilize these prior keys. This would allow the keys to be changed periodically without the loss of any locked data.

In still a further embodiment, key master 20 can incorporate Crypto Sentry checks to see if any non-authorized code is making calls to the encryption libraries or the Crypto System 28 routines. For example:

select * from ALL_SOURCE where upper(TEXT) like '%ENCRYPT_AES256%' select * from ALL_SOURCE where upper(TEXT) like '%DECRYPT%'

In still a further embodiment, project lead 22 can temporarily be given access to an account such as LBX_USER that can directly connect to the database and execute Crypto System 28 routines. For example:

1) The project lead 22 requests access to connect to an execute Crypto System 28 routines.
2) The request is authorized by a qualified 3$^{rd}$ party such as the key master 20
3) The gate keeper 18 gives EXECUTE privileges on Crypto System 28 to the LBX_USER account and sets SESSION privilege for this account to ON
4) The gate keeper 18 provides user credentials directly to the project lead 22 ESSION privilege for LBX_USER is set back to OFF immediately following the completion of the work by the project lead 22

Figure 4:
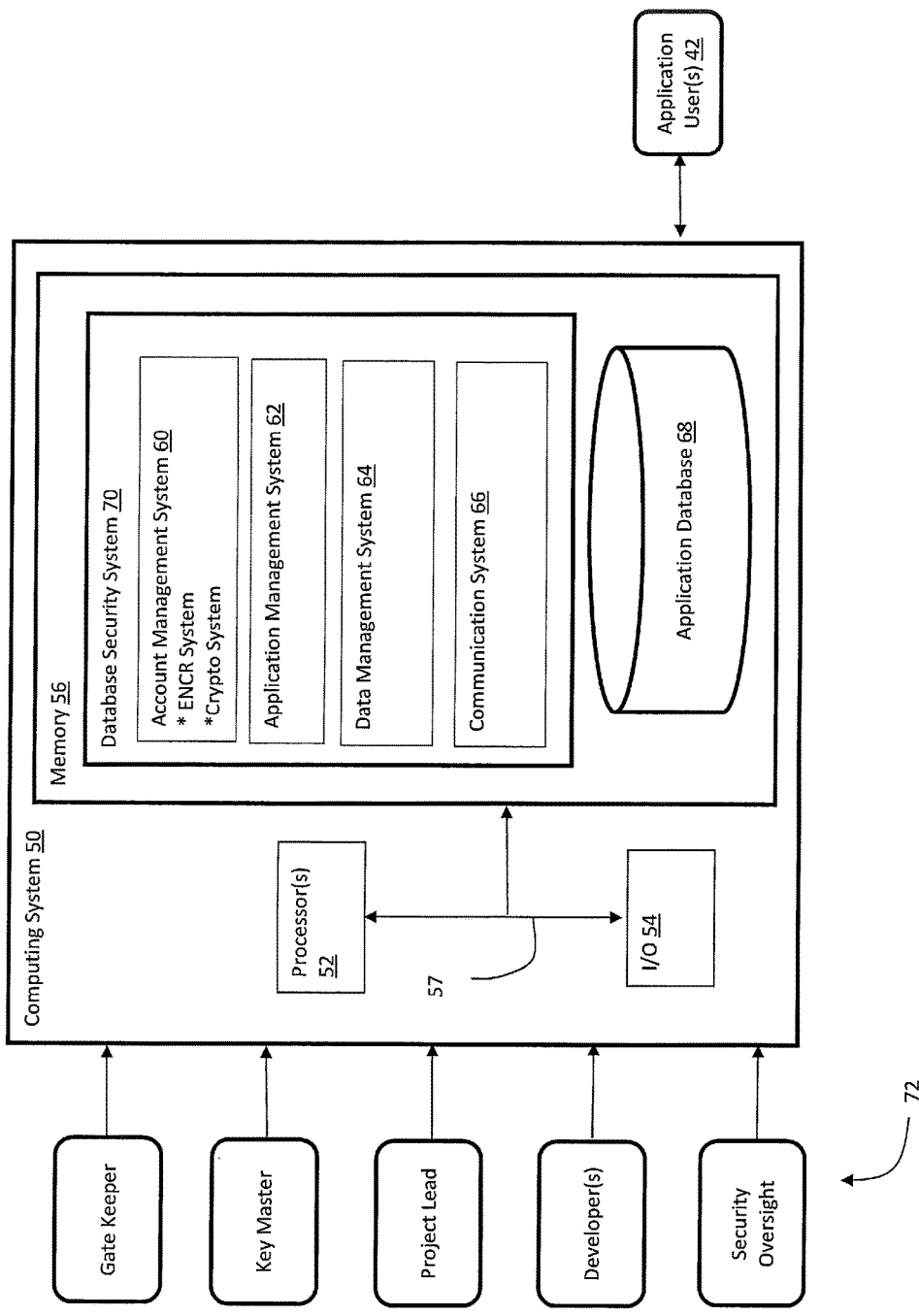
FIG. 4 shows a computing system for implementing a database security model.

FIG. 4 depicts an illustrative computing system 50 for implementing a database security system 70 to implement to above described database security model 10 for an application database 68. Database security system 70 generally includes an account management system 60 for establishing the crypto system 28 and ENCR system 30. As noted, the gate keeper role is largely responsible for creating accounts and establishing privileges. As such the account management system 60 would allocate the necessary resource for the gate keeper. Application management system 62 is responsible for establishing and managing the DB application 32. Associated permissions, firewalls, etc., may be handled by the application management system 62. Data management system 64 is responsible for setting up database tables and determining which data belongs in locked data 34 and which belongs in app data 36. Communication system 66 provides a platform through which the different roles can communicate with each other. For example, if a developer wanted to deploy a new encrypted code function 44 (FIG. 1), the developer could pass the code or an associated request to the project lead via the communication system 66.

It is understood that database security system 70 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 50 that may comprise any type of computing device and for example includes at least one processor 52, memory 56, an input/output (I/O) 54 (e.g., one or more I/O interfaces and/or devices), and a communications pathway 57. In general, processor(s) 52 execute program code which is at least partially fixed in memory 56. While executing program code, processor(s) 52 can process data, which can result in reading and/or writing transformed data from/to memory and/or I/O 54 for further processing. The pathway 57 provides a communications link between each of the components in computing system 50. I/O 54 can comprise one or more human I/O devices, which enable a user to interact with computing system 50. Computing system 50 may also be implemented in a distributed manner such that different components reside in different physical locations.

Furthermore, it is understood that the data security system 70 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A database security model for securing data in an application database, comprising:
   an encrypted storage area configured to store encrypted private data;
   a first level system for implementing a plurality of first level routines, wherein each of the first level routines is callable from a database application to process and provide limited access to decrypted private data and wherein the first level routines can only be modified with a first level user account having access rights separate from the database application; and
   a crypto system having a private key and decryption system that requires both the private key and a public key to decrypt encrypted private data in the encrypted storage area, wherein the crypto system decrypts private data in response to receiving a decrypt request and public key from a first level routine, and wherein the crypto system is accessible only with a crypto user account separate from the first level account and database application.

2. The database security model of claim 1, wherein user access to the first level routines and crypto system requires permission from a gate keeper.

3. The database security model of claim 1, wherein the crypto system keeps the public key only temporarily while the decrypt request is serviced by the decryption system.

4. The database security model of claim 1, wherein the crypto system is accessible by a key master with access rights granted by the gate keeper.

5. The database security model of claim 1, wherein the first level system is accessible by a project lead with access rights granted by the gate keeper.

6. The database security model of claim 2, wherein the gate keeper does not have access to the public key.

7. The data security model of claim 1, further comprising a crypto sentry that verifies all routines involved in passing the public key.

8. A computer program product stored on a computer readable storage medium, which when executed by a computing system, provides a database security model, the program product comprising:
   program code for providing access to encrypted private data in an encrypted storage area;
   first level program code for implementing a plurality of first level routines, wherein each of the first level routines is callable from a database application to process and provide limited access to decrypted private data and wherein the first level program code can only be modified with a first level user account having access rights separate from the database application; and
   second level program code having a private key and a decryption routine that requires both the private key and a public key to decrypt encrypted private data in the encrypted storage area, wherein the decryption routines decrypts private data in response to receiving a decrypt request and public key from the first level program code, and wherein second level program code is accessible only with a second level account separate from the first level account and database application.

9. The computer program product of claim 8, wherein user access to the first level program code and second level program code requires permission from a gate keeper.

10. The computer program product of claim 8, wherein the second level program code is prohibited from permanently storing the public key.

11. The computer program product of claim 8, wherein the second level program code is accessible by a key master with access rights granted by the gate keeper.

12. The computer program product of claim 8, wherein the first level program code is accessible by a project lead with access rights granted by the gate keeper.

13. The computer program product of claim 9, wherein the gate keeper does not have access to the public key.

14. The computer program product of claim 8, further comprising a crypto sentry that that verifies all routines involved in passing the public key.

15. A computerized method for implementing a database security model, comprising:
- maintaining encrypted private data in an encrypted storage area;
- receiving a request at an application database that requires access to encrypted private data;
- passing a first level request from the application database to a first level routine to return a limited amount of decrypted private data, wherein the first level routine can only be modified with a first level user account separate from the database application;
- processing the first level request and submitting a decrypt request along with a public key to a crypto system having a decryption routine that can only be modified with a second level user account separate from the first level user account;
- retrieving and decrypting private data within the crypto system using a stored private key and a submitted public key;
- passing decrypted private data to the first level routine; and
- returning a first level result to the database application.

16. The computerized method of claim 15, wherein user access to the first level routine and the decryption routine requires permission from a gate keeper.

17. The computerized method of claim 15, wherein the crypto system is prohibited from permanently storing the public key.

18. The computerized method of claim 16, wherein the crypto system is accessible by a key master with access rights granted by the gate keeper.

19. The computerized method of claim 16, wherein the first level routine is accessible by a project lead with access rights granted by the gate keeper.

20. The computerized method of claim 16, wherein the gate keeper does not have access to the public key.

* * * * *